United States Patent [19]

Pomella et al.

[11] 3,793,625

[45] Feb. 19, 1974

[54] NUMERICAL CONTROL SYSTEM FOR CONTROLLING SIMULTANEOUSLY A PLURALITY OF TOOLS OF ONE OR MORE MACHINE TOOLS

[75] Inventors: Piero Pomella; Luciano Lauro, both of Ivrea, Italy

[73] Assignee: Ing. C. Olivetti & C., S.p.A., Ivrea (Turin), Italy

[22] Filed: Sept. 21, 1972

[21] Appl. No.: 290,918

[30] Foreign Application Priority Data
Sept. 30, 1971 Italy .................................. 70210/71

[52] U.S. Cl............... 340/172.5, 235/151.11, 408/3
[51] Int. Cl. .............................................. G06f 7/28
[58] Field of Search............ 340/172.5; 235/151.11; 318/562; 408/3, 34, 42, 43; 29/33 R

[56] References Cited
UNITED STATES PATENTS

| | | | |
|---|---|---|---|
| 3,103,614 | 9/1963 | Mynall | 318/562 X |
| 3,439,346 | 4/1969 | McGee | 340/172.5 |
| 3,465,332 | 9/1969 | Neal et al. | 318/562 X |
| 3,559,257 | 2/1971 | Lemelson | 408/3 X |
| 3,609,321 | 9/1971 | Campbell, Jr. | 235/151.11 |
| 3,634,662 | 1/1972 | Slawson | 340/172.5 X |
| 3,665,499 | 5/1972 | Cutler | 235/151.11 X |

*Primary Examiner*—Gareth D. Shaw
*Assistant Examiner*—Melvin B. Chapnick

[57] ABSTRACT

A system for the numerical control of a plurality of machine tool positioning units by a single instruction program, comprising a reading unit which reads program data comprising addresses and numerical data from a record member and issue the data in succession at an output, and a plurality of positioning units connected to receive data from the output. Each positioning unit is adapted to recognise its own address among the addresses which appear at the output and to enable a corresponding input for the reception of numerical data following the address. Each positioning unit is also able to operate during the reading of the addresses and numerical data following and/or concerning the other positioning units.

3 Claims, 3 Drawing Figures

NUMERICAL CONTROL SYSTEM FOR CONTROLLING SIMULTANEOUSLY A PLURALITY OF TOOLS OF ONE OR MORE MACHINE TOOLS

BACKGROUND OF THE INVENTION

The present invention relates to a numerical control system adapted to control simultaneously a plurality of tools of one or more machine tools, or to command a tool along more than one co-ordinate axis, on the basis of instructions contained in a program recorded on punched or magnetic tape or other record member.

Prior art numerical control systems are capable of controlling a single positioning unit associated with a single tool, the positioning unit being permanently connected to a tape reader to control a tool sequentially along one axis after another.

Heretofore, it has been possible to effect the simultaneous execution of a plurality of operations on a part or workpiece to be machined, for example turning operations effected simultaneously in two zones of a workpiece, or the simultaneous boring of two or more holes by means of a multiple boring machine, etc., only with machines programmed by means of cams, pegs and such devices. These simultaneous multiple operations have therefore been convenient from the economic point of view only in the case of mass-production machining operations such as to justify the cost of the initial tooling-up.

In the case of machining operations carried out on small runs, in which the use of numerical control programs is imposed from the point of view of the cost, it has heretofore been necessary to carry out the individual operations in succession, with considerable lengthening of the over-all machining time.

The invention therefore seeks to solve the problem of simultaneous control of a plurality of positioning units by means of a single reading unit for the record member, permitting the simultaneous operation of the controlled positioning units on the basis of the instructions supplied individually to each by the reading unit.

The system of the invention moreoever permits the production of modular installations, which allow of gradually increasing capabilities, for example the number of axes or tools controlled by one reading unit, by the addition of successive modular units to a basic installation.

SUMMARY OF THE INVENTION

According to the present invention there is provided a system for the numerical control of a plurality of machine tool positioning units by a single instruction program, comprising a reading unit adapted to read and decode program data comprising addresses and numbers from a record member and to issue the data in succession at an output, and a plurality of positioning units connected to receive data from the said output, each positioning unit being adapted to recognise its own address among the addresses which appear at the said output and to enable a corresponding input for the reception of numeric data following the said address, and being able to operate during the reading of the addresses and numbers following and/or concerning the other positioning units.

BRIEF DESCRIPTION OF THE DRAWINGS

The invention will now be described in more detail, by way of example, with reference to the accompanying drawings, wherein.

DESCRIPTION OF THE PREFERRED EMBODIMENT

Figure 1:
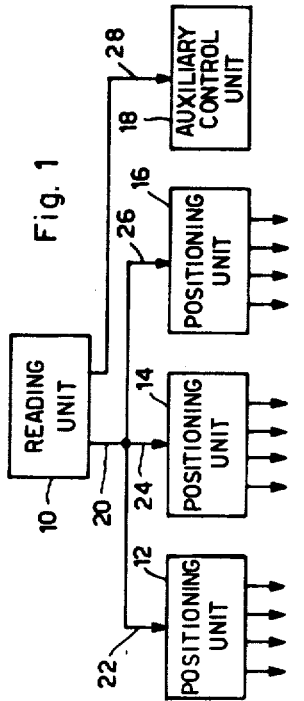
FIG. 1 is a general block diagram of a numerical control system comprising a plurality of positioning units controlled by a single reading unit.

In FIG. 1, a reading unit 10 is connected to control three positioning units 12, 14 and 16, respectively, for example for three groups of tool slides of a multi-tool lathe. Each of the positioning units is of known type adapted to command sequentially a maximum of four axes and is, for example, of the type described in the applicants' U.S. Pat. application Ser. No. 184,678 filed Sept. 29, 1971 now U.S. Pat. No. 3,751,651. The reading unit 10 also controls an electric control unit 18 for the execution of auxiliary functions.

The reading unit 10 reads data from a program recorded, for example, on eight-channel punched tape (not shown), for example in International Standard Organization (ISO) code. The program comprises, in known manner, designations of axes of movement of the controlled tool, followed by positioning dimensions for the tool itself comprising a maximum of either digits: moreover, the program comprises instructions for auxiliary functions, such as rate of feed, etc., which are constituted by an auxiliary function code and a two-digit number. The units of measurement employed, the nature of the auxiliary functions, etc., are of no relevance in the present invention and will not be considered further.

The reading unit 10 emits the data read from the program in succession in parallel form on a single multi-wire output 20. From the output 20 of the reading unit the data are applied to the respective inputs 22, 24, 26 of the positioning units 12, 14, 16. Moreover, the reading unit 10 emits auxiliary function instructions on an output 28 connected to the electric control unit 18.

Each item of data is emitted by the reading unit 10 on the output 20 in the form of 4 bits on respective lines. The output 20 moreover comprises a designation line for a signal EN which is normally at level 0 and assumes the level 1 when the data emitted by the reading unit 10 is an address. Two more lines connecting the unit 10 to the positoning units serve for sending signals of consent (PP) to the transmission of a number or dimension and signals (TP8) for timing the extraction of the number from the reading unit to the positioning units, respectively, as will be seen hereinafter.

Figure 2:
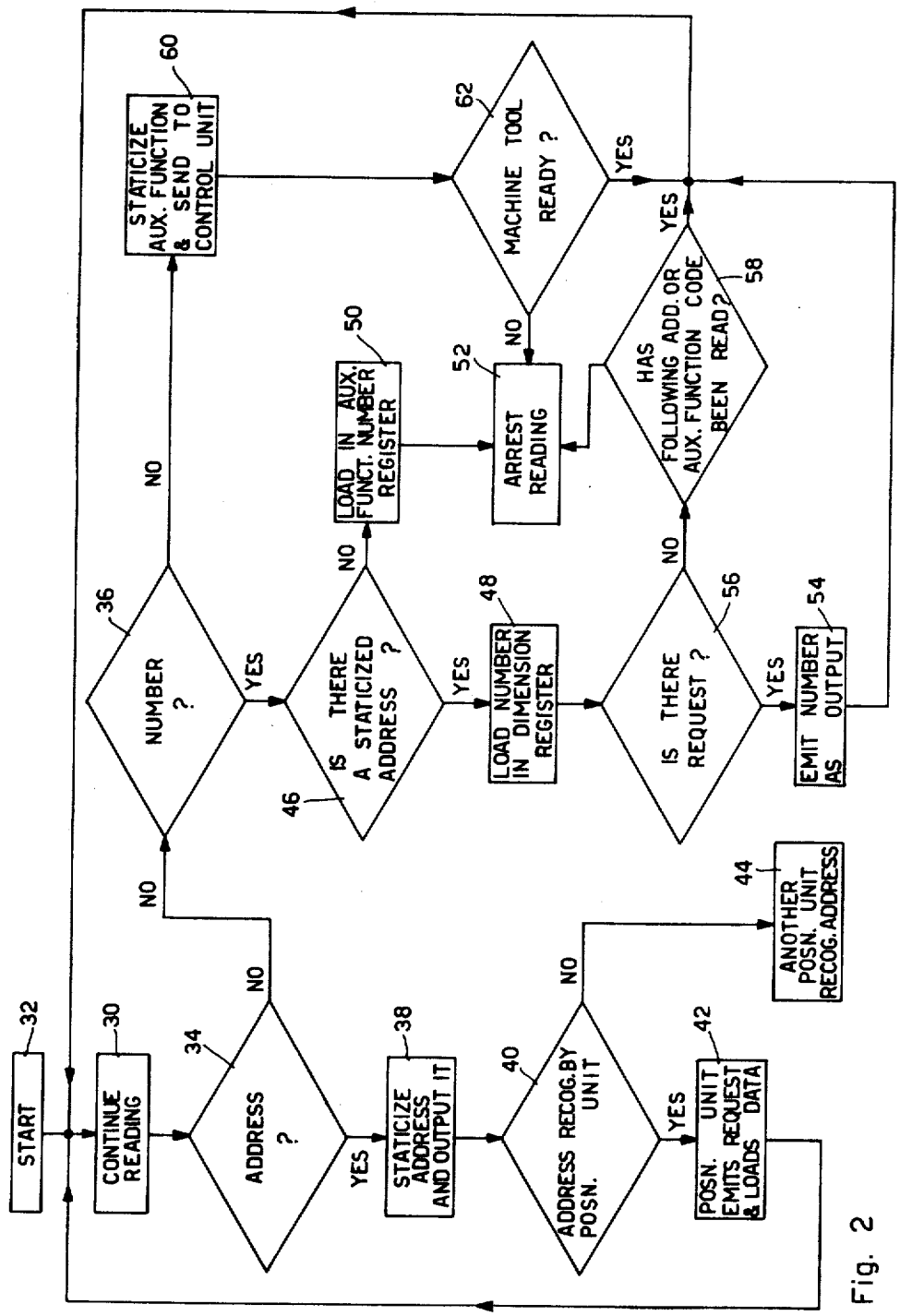
FIG. 2 is a flow diagram illustrating the working process of a system according to FIG. 1.

The flow diagram of FIG. 2 illustrates in simplified manner the sequence of the operations carried out by the reader and positioning units system.

In the block 30 there is carried out the reading of an item of data on the punched tape which is initiated on the starting of the program by the operator by means of a push button (block 32). The data read is subjected in the reader to a decoding adapted to recognise whether the data is an axis address, a number or an auxiliary function code (blocks 34, 36). If the data is an axis address or designation, it will have to be transcoded and staticized and rendered available on the output 20 in FIG. 1, together with a designation signal EN, which prepares the positioning units for the reception of an address (block 38). In the block 40, each positioning unit decodes the address emitted by the reader 10 to recognise whether it belongs to it. In the affirmative case and if the positioning unit is ready to receive the dimension, it emits a signal (PP) of consent and thereby requests the extraction of the dimension from the corresponding register of the reader 10 and loads the dimension into the register associated with the addressed axis (block 42). In the negative case, the positioning unit in question does not emit a request, which will be emitted, on the other hand, by another positioning unit which has recognised the address as its own (block 44).

If the data decoded in the block 34 does not prove to be an address, but a numerical quantity (block 36), this may be a dimension, if the number follows an address in the program, or of the specification of an auxiliary function, if the number follows an auxiliary function code. Therefore, a check is made in the block 46 as to whether there is an address staticized in the reader. In the affirmative case, the number is loaded as a dimension into the respective register (block 48) of the reading unit. If there is no staticized address, the number is routed to a register associated with the auxiliary functions (block 50), after which the reading is stopped (block 52).

From the block 48 appertaining to the loading of a number into the dimension register, the following step of the program is the emission of the dimension as output from the reading unit (block 54) for storage by a positioning unit. This operation is conditional on the existence (block 56) of a constant signal (PP) from a positoning unit (block 42), and is followed by a consent to the advance of the reading.

If, in the block 56, there does not prove to be a request for dimension data, after a check that a further address or auxiliary function has been read (block 58) provision is made for stopping the reading. Otherwise, the advance of the reading is confirmed.

When an item of data is not an address or a number, but an auxiliary function code, it is staticized in an auxiliary function store (block 60), which sends the code to the electric control unit 18 of the machine tool. If the machine tool is not ready to receive instruction in relation to the staticized auxiliary function (block 62), the reading is stopped. If, or when, the machine tool is ready, the reading is caused to advance.

It is therefore clear that the reading unit can send a given instruction immediately after the preceding one has been accepted by a positioning unit, as a result of which the positioning of the various axes and tools can take place during the operation of a tool. In this way, therefore, the tools are controlled alternately in such manner as to be able to work substantially simultaneously.

The flow diagram described is simplified, inasmuch as it does not include parity, format, etc., checks normally obtaining in numerical control systems, nor does it provide for program errors, services, protections, etc. On the other hand, it describes the essential processing stages which are at the root of the invention. Moreover, the handling of the instructions concerning auxiliary functions, which does not substantially concern the invention, has been described only in its interaction with the rest of the carrying out of operation.

Figure 3:
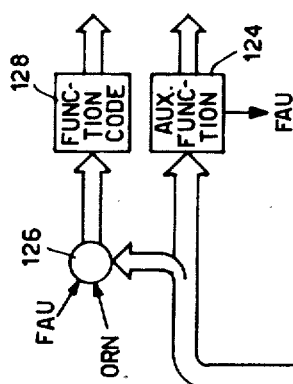
FIG. 3 is a more detailed diagram of part of the system of FIG. 1.
Figure 3:
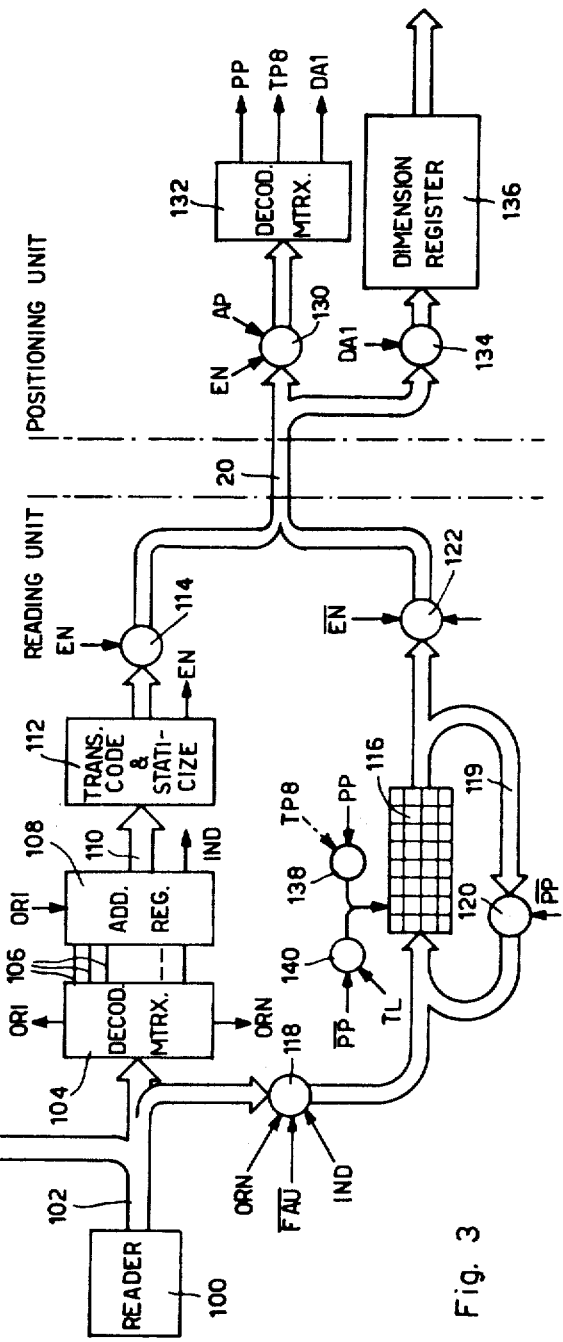

The system of the invention will now be described in greater detail with reference to FIG. 3. FIG. 3 shows in essence the operative portion of the reading unit 10 of FIG. 1 and an input portion of a positioning unit forming part of an assembly of positioning units (three at the most) which are connected to the output of the reading unit.

A reading device 100 of any suitable known type reads data from a punched tape (not illustrated) in ISO code and emits the same on an eight-channel output 102. The data present on the output 102 is decoded in a decoding matrix 104, for example of the diode type, which recognizes whether the incoming data is an address and applies it in such case on twelve lines 106 to a flip-flop register 108, simultaneously emitting a signal ORI, which indicates the existence of an address at the input of the register 108. The lines 106 connecting the decoding matrix 104 to the register 108 are constituted by bridging links (not shown in the drawing) to allow, in known manner, the arbitrary allocation of the designations to the various controlled axes.

The signal ORI generated by the decoding matrix 104 enables the register 108, causing the staticization of the decoded address therein. The register 108, in turn, emits a signal IND to indicate that there is a staticized address.

The 12-line output 110 of the register 108 extends to a transcoding and staticization circuit 112 also comprising, for example, a diode matrix and a flip-flop register, which circuit transcodes the address from 12 lines to four lines, staticizing it and emitting a designation emission signal EN, which enables a gate 114 for the emission of the staticized address at the output 20 of the reading unit.

The four bits of the address emitted at the output 20 of the reading unit comprise 2 bits for designation of the positioning unit and 2 bits for designation of the axis in a particular positioning unit. While the two axis bits may assume any one whatsoever of the four possible configurations, in order to designate in this way four axes for each positioning unit, the two bits for designation of the positioning unit may assure only three significant configurations, the configuration 00 being eliminated, and are therefore able to distinguish only three positioning units.

The decoding matrix 104 is also able to recognise whether the data read is a number, generating in such case a signal ORN indicating that the data present at the output of the reading device 100 is a number. In this case, as known, in the ISO code the four least significant channels of the punched tape represent the decoded data, that is in binary coded decimal. Therefore, the four least significant channels are applied to the input of a shift register 116 through a gate 118 enabled by the presence of the signals ORN and IND, in addition to a signal $\overline{FAU}$, the significance of which will be described hereinafter.

The shift register 116 is able to receive eight characters, which correspond to the maximum length (eight decimal digits) of a numeric dimension datum, and is provided with a loop 119 for the recirculation of the data under the control of timing pulses TL, with the consent of a signal $\overline{PP}$ acting on a gate 120 which is described hereinafter.

A gate 122 is adapted to permit the emission of the numeric data stored in the register 116 at the output 20 of the reading unit. This emission is enabled by the presence of a signal $\overline{EN}$ indicating that the reading unit is not emitting an address, and moreover by the signal PP described hereinafter.

The data issuing from the reading device 100 is also applied, apart from to the address decoding matrix 104, to an auxiliary functions decoding matrix 124, which is adapted to recognise an auxiliary function code, staticizing it in a flip-flop store (not separately shown) and emitting a signal FAU. The signal FAU enables, for the duration of two digits, together with the signal ORN, a gate 126 for the input of a possibly following numeric datum into a register 128. As already described for the numeric dimension data, the four least significant channels of the output 102 of the reading device are also selected in this case. The subsequent utilization of the auxiliary function codes and numeric data, which are sent to the electric control unit 18 of the machine tool separately from the other data, will not be further described inasmuch as it does not form part of the invention.

The signal FAU emitted by the auxiliary functions decoding matrix 124 enables the significance of the numbers emitted by the reading device 100 to be distinguished. The numbers are in fact all recognised by the address decoding matrix 104, which in this case sends its own signal ORN both to the gate 118 and to the gate 126. The latter gate, however, also calls for the presence of confirmation that the number is associated with an auxiliary function (FAU), while the gate 118 calls for the presence of $\overline{FAU}$ and of IND.

The output 20 of the reading unit, as can be seen in FIG. 1, is connected to the inputs of a plurality of positioning units; only one of these is shown partially in FIG. 3. It comprises an input gate 130 to a decoding matrix 132 and a plurality of dimension registers 136 (only one of which is shown), each corresponding to a different controlled axis, which registers can have data entered therein through respective gates 134. The gate 130 is enabled by the signal EN, indicating that the output data at the moment is an axis designation or address, and by a signal AP generated by means (not shown) included in the known part of the positioning unit, and indicating that the tool is in a ready position, that is, that it has been mounted correctly and that the possible preceding instruction has been executed. If the decoding matrix 132 recognises the address received as its own, it emits for the reading unit a positioning-unit ready signal PP, which is also conditioned by there having been performed the functions commanded by the register 128 and a signal TP8 constituted by a sequence of eight timing pulses, equal to the number of digits making up a dimension. Both these signals are sent to the reading unit. Moreover, the decoding matrix 132 emits a signal DA1 designating the first axis, which enables the gate 134 for the input into the axis dimension registers 136 of the numeric data thereafter applied to the output 20 of the reading unit. The matrix 132 is adapted to generate one or more signals DA1, DA2, . . . for each of the dimension registers 136, each associated with a different axis. 124

The signal PP, passing to level 1, gives consent to the opening of the gate 122 for the extraction of the data stored in the register 116, 119, while passage to the level 0 of the signal $\overline{PP}$ interrupts the recirculation of the datum in the register 116, as a result of which the data is transferred to the register 136.

Thus, the signals PP and $\overline{PP}$ respectively enable two gates 138, 140, the outputs of which control in an OR function the timing of the shift register 116. During the presence of the signal PP, the gate 138 introduces the train of timing pulses TP8 sent by the positioning unit, to synchronize the register 116, 119 with the elements of the positioning unit during the extraction of the data. The gate 140 enables the register 116, 119 to be timed, on the other hand, by the timing pulses TL of the reading unit in the remainder of the time. This is a very important characteristic of the preferred embodiment of the invention, which permits independent operation of the reading unit and the positioning units in any instant except during the transfers of dimensions. In particular, it enables the same control unit to be adapted to any data positioning system.

In the description there have not been indicated either the timings, it being understood that the reading unit and each positioning unit are each provided with independent timing, or the generation of the signals for advance or arrest of the reading, inasmuch as this does not present problems with respect to the known case of a reading unit placed in control of a single positioning unit. However, in this case, the advance signals may come from any positioning unit immediately after the storing of the data in the respective register 136.

What we claim is:

1. A system for the numerical control of a plurality of machine tool positioning units by a single program, said program including addresses and numerical data, said system comprising:
   a reading unit including:
      reading means for reading a program from a recording medium;
      means connected to said reading means for distinguishing between addresses and numerical data read by said reading means;
      first storage means responsive to the sensing by said distinguishing means of an address for storing said address, said first storage means including means for indicating the presence of an address stored therein;
      second storage means responsive to the sensing of numerical data by said distinguishing means for receiving and storing said numerical data;
   a plurality of positioning units connected to the reading unit each including:
      decoding means responsive to the indication by said indicating means of an address in said first storage means for decoding said address to determine if it addresses that positioning unit;
      a plurality of registers each for controlling the operation of the positioning unit along an axis of movement, said decoding means including means responsive to the decoding of the address of that positioning unit for enabling a selected one of said registers for receiving the data stored in said second storage means.

2. The system of claim 1 wherein said numerical data follows the address associated therewith on said recording medium and wherein said second storage means includes a shift register for storing said numerical data, said shift register being controlled by timing pulses from said reading unit during the transfer of numerical data from said recording medium to said shift register and by timing pulses from the addressed positioning unit during the transfer of said numerical data from said shift register to said addressed positioning unit.

3. The system of claim 1 wherein said first storage means including a first storage register responsive to the sensing of an address by said distinguishing means for receiving and storing said address and transcoding and storage means for transcoding and storing the address stored in said first storage register.

* * * * *